(12) United States Patent
Sawada

(10) Patent No.: US 12,682,599 B2
(45) Date of Patent: Jul. 14, 2026

(54) IMAGE PROCESSING METHOD

(71) Applicant: NEC Corporation, Tokyo (JP)

(72) Inventor: Azusa Sawada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 491 days.

(21) Appl. No.: 18/026,530

(22) PCT Filed: Sep. 28, 2020

(86) PCT No.: PCT/JP2020/036616
§ 371 (c)(1),
(2) Date: Mar. 15, 2023

(87) PCT Pub. No.: WO2022/064687
PCT Pub. Date: Mar. 31, 2022

(65) Prior Publication Data
US 2023/0360361 A1 Nov. 9, 2023

(51) Int. Cl.
G06V 10/75 (2022.01)
G06T 7/50 (2017.01)
G06T 7/70 (2017.01)
G06V 10/25 (2022.01)

(52) U.S. Cl.
CPC .............. G06V 10/751 (2022.01); G06T 7/50 (2017.01); G06T 7/70 (2017.01); G06V 10/25 (2022.01); *G06V 2201/07* (2022.01)

(58) Field of Classification Search
CPC . G06T 2207/30232; G06T 2207/10044; G06T 7/194; G06T 2207/20224; G06T 7/254; G06T 7/50; G06T 7/70; G06T 7/248;

G06V 20/10; G06V 10/751; G06V 10/25; G06V 2201/07; G06V 10/255; G06V 20/58; G06V 20/13; G06V 20/17; G06V 10/22; G05B 2219/40563
See application file for complete search history.

(56) References Cited

FOREIGN PATENT DOCUMENTS

| JP | 2004364212 A | * | 12/2004 |
| JP | 2010039580 A | * | 2/2010 |
| JP | 2012-088861 A | | 5/2012 |
| JP | 2019-175142 A | | 10/2019 |
| KR | 101736899 B1 | * | 4/2016 |

OTHER PUBLICATIONS

International Search Report for PCT Application No. PCT/JP2020/036616, mailed on Dec. 15, 2020.

* cited by examiner

*Primary Examiner* — Matthew C Bella
*Assistant Examiner* — Janice E. Vaz
(74) *Attorney, Agent, or Firm* — Sughrue Mion, PLLC

(57) ABSTRACT

An image processing device 100 of the present invention includes a region extraction unit 121 that extracts, from a captured image, a mobile body region that is a region having a possibility that a mobile body exists, a matching unit 122 that performs template matching on the mobile body region by using a template corresponding to a mobile body that is a detection object, and a detection unit 123 that detects each mobile body from the mobile body region separately, on the basis of the template matching.

11 Claims, 14 Drawing Sheets

TARGET IMAGE

BACKGROUND IMAGE

DIFFERENCE IMAGE

TARGET IMAGE 4-1

4-2

4-3

TARGET IMAGE

BACKGROUND IMAGE

DIFFERENCE IMAGE

TARGET IMAGE

BACKGROUND IMAGE

DIFFERENCE IMAGE

TARGET IMAGE

BACKGROUND IMAGE

DIFFERENCE IMAGE

TARGET IMAGE

BACKGROUND IMAGE

DIFFERENCE IMAGE

IMAGE PROCESSING METHOD

This application is a National Stage Entry of PCT/JP2020/036616 filed on Sep. 28, 2020, the contents of all of which are incorporated herein by reference, in their entirety.

TECHNICAL FIELD

The present invention relates to an image processing method, an image processing system, and a program.

BACKGROUND ART

Marine surveillance is performed by detecting sea-going vessels with use of captured images such as satellite images. In particular, by using synthetic aperture radar (SAR) images in which a ground surface is imaged from a high altitude as captured images, it is possible to perform marine surveillance not affected by the weather.

Patent Literature 1 discloses an example of detecting a vessel by using an SAR image. In the art disclosed in Patent Literature 1, a captured image is binarized and a region with high luminance is extracted as a candidate vessel.

CITATION LIST

Patent Literature

Patent Literature 1: JP 2019-175142 A

SUMMARY OF INVENTION

Technical Problem

However, the art disclosed in Patent Literature 1 causes a problem that when a plurality of vessels are at anchor close to each other in port, each vessel cannot be detected with high accuracy due to interference between the vessels. For example, when two vessels are at anchor close to each other, they may be grouped and erroneously detected as one vessel. This causes a problem that detection may not be performed with high accuracy not only in the case of detecting a vessel and the case of a water region in a captured image, but also in the case of detecting a mobile body located in a specific region.

In view of the above, an object of the present invention is to provide an image processing method, an image processing system, and a program capable of solving the above-described problem, that is, a problem that a mobile body in a captured image cannot be detected with high accuracy.

Solution to Problem

An image processing method that is one aspect of the present invention is configured to include extracting, from a captured image, a mobile body region that is a region having a possibility that a mobile body exists, performing template matching on the mobile body region by using a template corresponding to a mobile body that is a detection object, and detecting each mobile body from the mobile body region separately, on the basis of the template matching.

Further, an image processing device that is one aspect of the present invention is configured to include a region extraction unit that extracts, from a captured image, a mobile body region that is a region having a possibility that a mobile body exists, a matching unit that performs template matching on the mobile body region by using a template corresponding to a mobile body that is a detection object, and a detection unit that detects each mobile body from the mobile body region separately, on the basis of the template matching.

Further, a program that is one aspect of the present invention is configured to cause an information processing device to execute processing to extract, from a captured image, a mobile body region that is a region having a possibility that a mobile body exists, perform template matching on the mobile body region by using a template corresponding to a mobile body that is a detection object, and detect each mobile body from the mobile body region separately, on the basis of the template matching.

Advantageous Effects of Invention

With the configurations described above, the present invention is capable of detecting a mobile body in a captured image with high accuracy.

DESCRIPTION OF EMBODIMENTS

First Exemplary Embodiment

Figure 1:
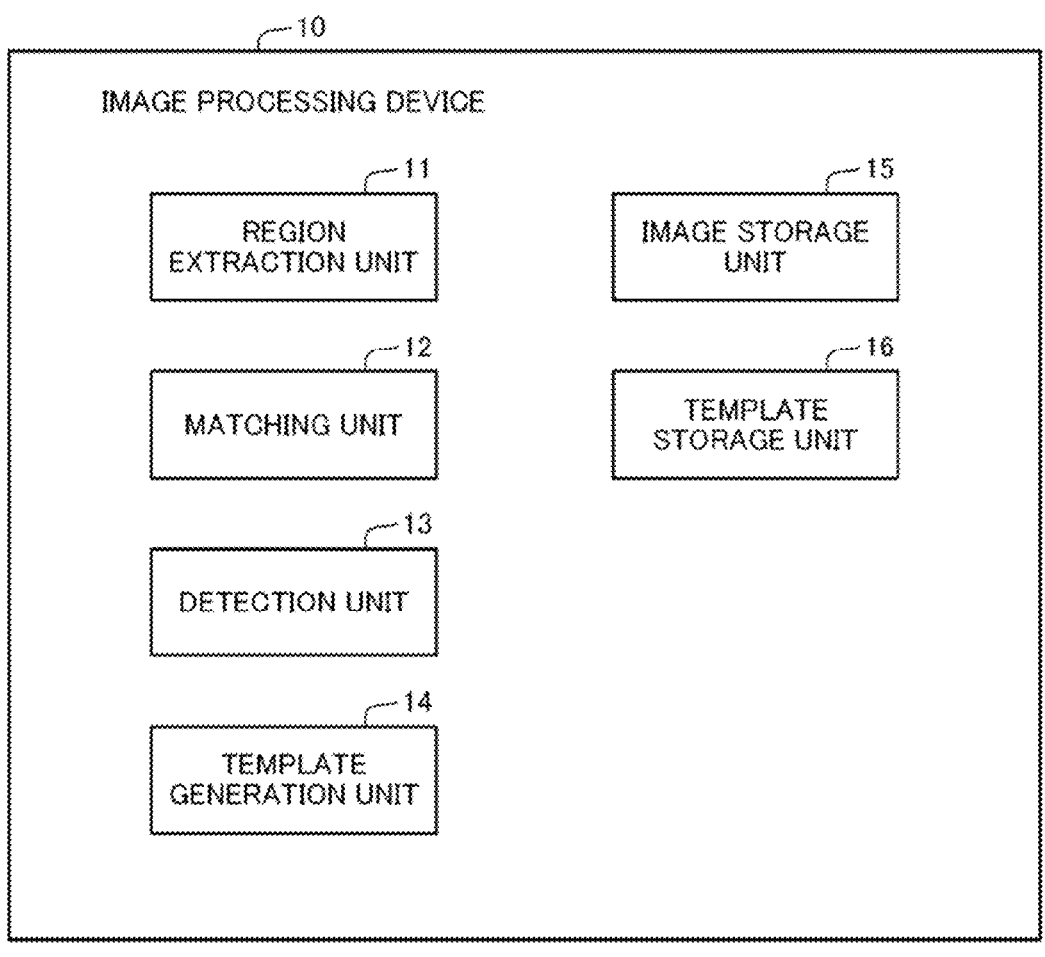
FIG. 1 is a block diagram illustrating a configuration of an image processing device according to a first exemplary embodiment of the present invention.

A first exemplary embodiment of the present invention will be described with reference to FIGS. 1 to 11. FIG. 1 is a diagram for explaining a configuration of an image processing device, and FIGS. 2 to 6 are diagrams for explaining a processing operation of the image processing device. FIGS. 7 to 11 are diagrams for explaining other processing operations of the image processing device.

[Configuration]

An image processing device 10 of the present embodiment is used for detecting a sailing vessel or an anchored vessel in order to perform marine surveillance from captured images such as satellite images captured using a synthetic aperture radar (SAR). However, the image processing device 10 does not necessarily image a region on the sea, but may image any region. Moreover, the image processing device 10 is not limited to detecting a vessel from a captured image, but may detect any mobile body. For example, the image processing device 10 may image a region such as an airport and detect a mobile body such as an aircraft, as described below. Furthermore, an image to be processed by the image processing device 10 is not limited to a satellite image captured using an SAR, but may be any image.

The image processing device 10 is configured of one or a plurality of information processing devices each having an arithmetic device and a storage device. As illustrated in FIG. 1, the image processing device 10 includes a region extraction unit 11, a matching unit 12, a detection unit 13, and a template generation unit 14. The respective functions of the region extraction unit 11, the matching unit 12, the detection unit 13, and the template generation unit 14 can be implemented through execution, by the arithmetic unit, of a program for implementing the respective functions stored in the storage device. The image processing device 10 also includes an image storage unit 15 and a template storage unit 16. Each of the image storage unit 15 and the template storage unit 16 is configured of a storage device. Hereinafter, the respective constituent elements will be described in detail.

The image storage unit 15 stores therein a target image (object image) that is an image of a sea that is a region (object region) from which a vessel, or a mobile body, is detected. A target image is, for example, a satellite image captured using an SAR as illustrated in the upper drawing of FIG. 2, and is mainly an image of the sea, but includes a land adjacent to the sea and an object provided on the land. Regarding the luminance value of a pixel in the target image, pixels of a land, an object on the land, and a vessel take high pixel values, and pixels of a water region that is the sea take low pixel values. Since a target image is a satellite image, it is associated with position information such as latitude and longitude on the earth based on information such as an orbit of the satellite and setting of an imaging device.

Figure 2:
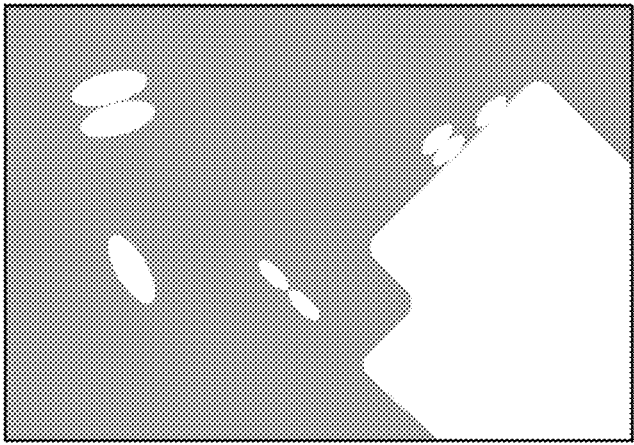
FIG. 2 illustrates a state of image processing by the image processing device disclosed in FIG. 1.
Figure 2:
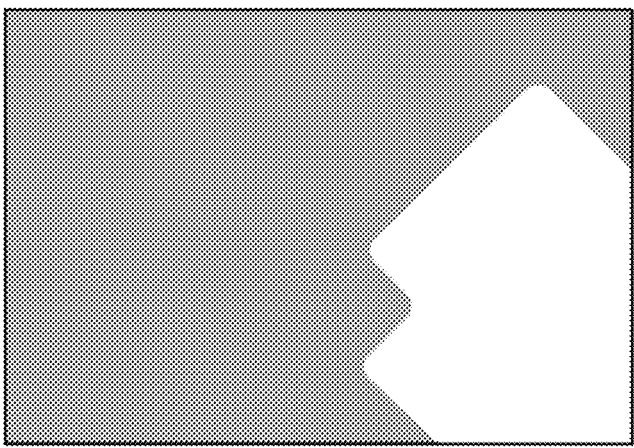
Figure 2:
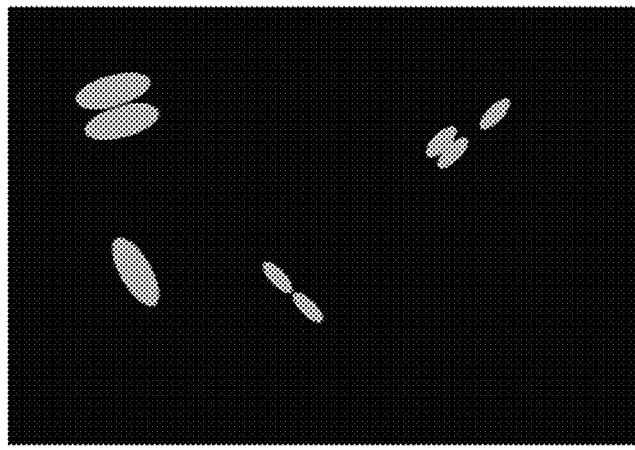
Figure 3:
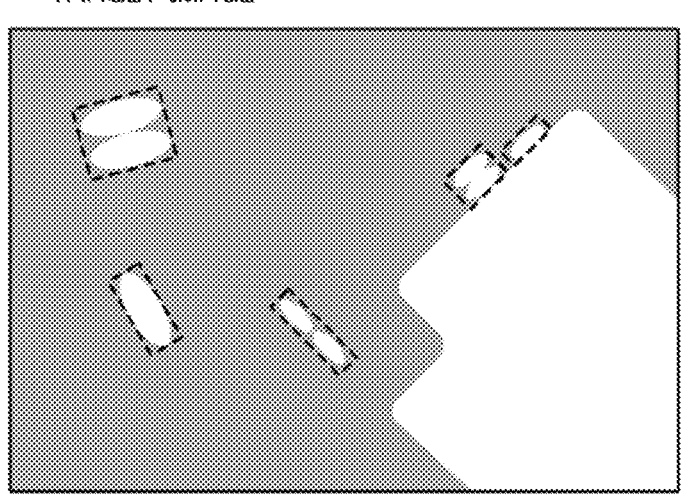
FIG. 3 illustrates a state of image processing by the image processing device disclosed in FIG. 1.
Figure 3:
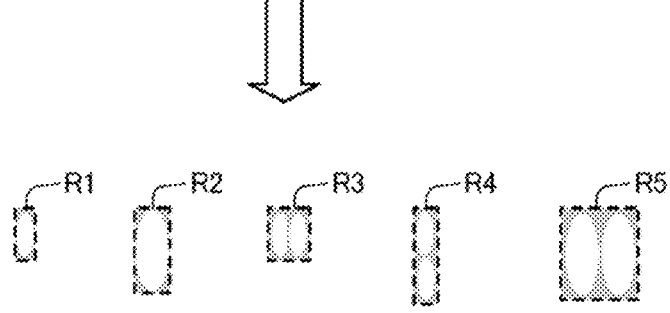

Further, the image storage unit 15 stores therein a background image (corresponding image) that is a satellite image captured by using an SAR as similar to the target image and is an image of a region corresponding to the object region in the target image, that is, the sea that is a region almost the same as the object region, as illustrated in the central drawing of FIG. 2. In particular, a background image is a captured image at the time when there is no vessel moving in the object region such as the sea. Therefore, a background image is configured of an image captured in a time period when there is no vessel in the object region, or an image in which image processing to remove a mobile body, that is, a vessel, is performed on a plurality of past images of the object region. For example, a background image may be generated by performing positioning of a plurality of past captured images of the object region and selecting the minimum value for each pixel to thereby remove the pixels having high luminance values that may be determined to be a vessel, as described below. Since a background image is a satellite image itself or generated from a satellite image, it is associated with position information such as latitude and longitude on the earth based on information such as an orbit of the satellite and setting of the imaging device.

Further, the image storage unit 15 stores therein a difference image representing a difference between the target image and the background image. Specifically, the difference image is an image that is generated such that a difference between luminance values of pixels corresponding to each other in the target image and the background image is used as a new pixel value, as described below. Therefore, as illustrated in the lower drawing of FIG. 2 for example, in the difference image, a portion in the target image having a change in the luminance value relative to the background image takes a high luminance value, so that a portion where a mobile body is not present in the background image but is present in the target image is particularly represented by a high luminance value relative to the surroundings. Since a difference image is generated from a target image and a background image that are satellite images, it is associated with position information such as latitude and longitude on the earth based on information such as an orbit of the satellite and setting of the imaging device.

Note that the image storage unit 15 stores therein map information of an object region in which the target image and the background image are captured. In particular, map information includes position information of a land of the object region, and includes position information such as latitude and longitude on the earth of the land, for example.

The region extraction unit 11 performs processing to extract, from a captured image that is a target image, a mobile body region that is a region where a mobile body may exist. In particular, the region extraction unit 11 extracts a mobile body region by using the target image and the background image as described below. Specifically, the region extraction unit 11 first extracts, from the image storage unit 15, a target image captured at a predetermined time that is an object of processing to detect a vessel, and a background image, generates a difference image from the target image and the background image, and stores it. For example, the region extraction unit 11 performs positioning of the target image illustrated in the upper drawing of FIG. 2 and the background image illustrated in the central drawing of FIG. 2, on the basis of the position information, the similarity in the topography in the images, and the like, and calculates a difference between the luminance values of pixels corresponding to each other. Then, the region extraction unit 11 generates a difference image as illustrated in the lower drawing of FIG. 2 by using the difference as a new pixel value. As a result, the generated difference image is an image in which a part in the target image where the luminance value has a change relative to the background image, that is, a mobile body part in particular, is indicated by a higher luminance value relative to the surroundings. However, the difference image may be generated by a method other than that described above. For example, in the case of using a combination of a target image and a background image that are not captured on the same orbit by the satellite, it is possible to generate a difference image by applying a technique enabling extraction of a change excluding a distortion difference on an image for each orbit and performing positioning of the target image and the background image.

Note that the region extraction unit 11 may have a function of generating a background image to be used for generating a difference image. In that case, the region extraction unit 11 generates a background image by acquiring past captured images of the object region previously stored, performing positioning on those captured images on the basis of the position information, similarity in the topography in the images, and the like, and selecting a minimum value for each pixel to thereby remove pixels having high luminance values that may be determined as a vessel. However, a background image may be generated by any method.

Then, the region extraction unit 11 extracts a pixel of a candidate vessel on the target image on the basis of the difference image generated as described above. For example, the region extraction unit 11 extracts a pixel having a higher luminance value with respect to the surroundings in the difference image as a pixel of a candidate vessel. Then, the region extraction unit 11 specifies a region where a vessel may exist located on the target image on the basis of the pixel extracted as a candidate vessel, and extracts the region as a mobile body region. For example, the region extraction unit 11 generates a region including a figure constituted of a plurality of pixels as one shape, on the basis of the distance between the pixels extracted as a candidate vessel. As an example, when the pixels extracted as a candidate vessel are adjacent to each other or located within a range of a certain distance, the region extraction unit 11 generates a rectangular figure surrounding the set of the pixels, and extracts the generated rectangular region as a mobile body region. Then, the region extraction unit 11 sets, on the target image, a region at the same location as that of the mobile body region extracted on the difference image. As a result, as illustrated by a rectangle of a dotted line in FIG. 3, the region extraction unit 11 extracts the mobile body region on the target image. Here, it is assumed that on the target image, regions denoted by reference signs R1, R2, R3, R4, and R5 are extracted as mobile body regions. However, the region extraction unit 11 is not limited to extract a rectangular mobile body region. The region extraction unit 11 may extract a mobile body region of any shape, and may use the region in which pixels extracted as a candidate vessel are put into one directly as a mobile body region.

The matching unit 12 performs processing to detect a mobile body that is a vessel from the mobile body region extracted as described above. Specifically, the matching unit 12 uses a prepared template representing features of a vessel to be detected to perform template matching by comparing the template with a figure in the mobile body region.

Figure 4:
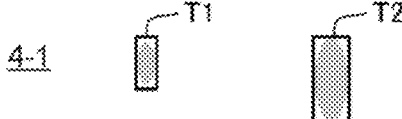
FIG. 4 illustrates a state of image processing by the image processing device disclosed in FIG. 1.
Figure 4:
Figure 4:
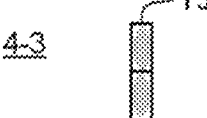

Here, an example of a template matching process will be described. First, in the template storage unit 16, a template as illustrated in FIG. 4(4-1) is stored. For example, a template is image information representing features of one vessel. As the template, the shape and the size of an existing vessel, a luminance feature amount representing the surface pattern when viewed from the sky of the existing vessel, and the like are used. As an example, in the present embodiment, it is assumed that one defining the shape and the size of one small vessel denoted by a reference sign T1 in FIG. 4(4-1) and one defining the shape and the size of one large vessel denoted by a reference sign T2 in FIG. 4(4-1) are prepared as templates. Note that FIG. 4(4-2) and FIG. 4(4-3) also illustrate examples of templates, which will be described later. Further, each template may be linked with a position on the map and the time at which a matching process is applied to a mobile body region, as described later.

Figure 5:
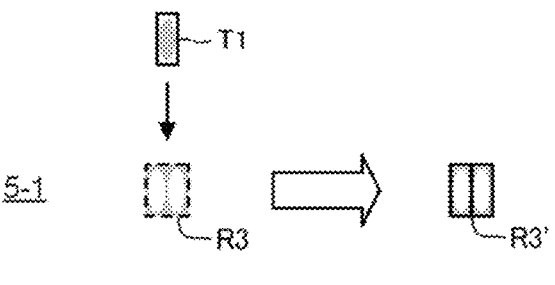
FIG. 5 illustrates a state of image processing by the image processing device disclosed in FIG. 1.
Figure 5:
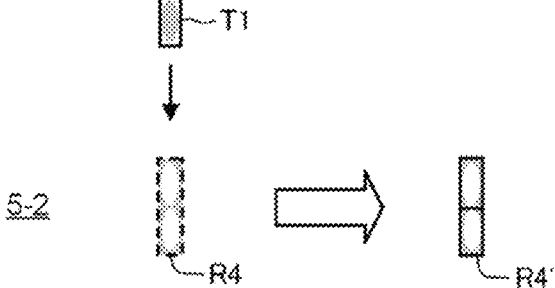
Figure 5:
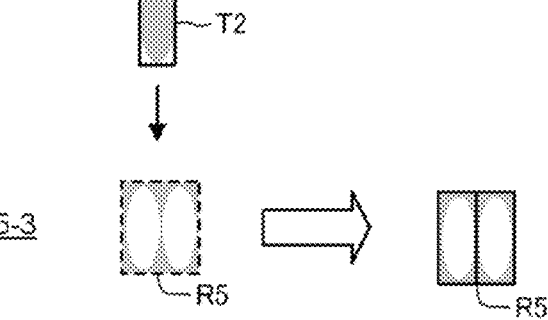

Then, the matching unit 12 checks the matching degree with each template, with respect to each of the extracted mobile body regions. For example, in the case of using a template defining the shape and the size of a vessel as illustrated in FIG. 4(4-1), the matching unit 12 checks the matching degree of the areas between the part of an object where the luminance value is high in the mobile body region and the vessel part of the template. At that time, when the outer appearance of the mobile body region has a shape that can contain a plurality of templates, the matching unit 12 may arrange the template while shifting it within the mobile body region and check the matching degree with the part of the object having a high luminance value in the mobile body region at each position. For example, as illustrated in FIG. 5(5-1), in the case of performing template matching using the template T1 with respect to the mobile body region R3, the matching degree is checked by disposing two pieces of templates T1. In the case where a region in which pixels extracted as a candidate vessel are put into one as described above is directly used as a mobile body region, the matching unit 12 may check the matching degree between the mobile body region and the template.

As a result of the template matching, when the matching degree is equal to or larger than a preset threshold, the detection unit 13 detects a mobile body of the mobile body region as a vessel. At that time, when the detection unit 13 performs template matching by arranging a plurality of templates in one mobile body region and the matching degree in each region is equal to or larger than a threshold, the detection unit 13 detects a plurality of vessels. That is, the detection unit 13 detects each of the plurality of vessels separately from one mobile body region. As an example, in the example illustrated in FIG. 5(5-1), through template matching performed by using the template T1 of a small vessel on the mobile body region R3, two vessels adjacent to each other in a horizontal direction are detected separately as denoted by a reference sign R3'. As another example, in the example illustrated in FIG. 5(5-2), through template matching performed by using the template T1 of a small vessel on the mobile body region R4, two vessels adjacent to each other in a vertical direction are detected separately as denoted by a reference sign R4'. As another example, in the example illustrated in FIG. 5(5-3), through template matching performed by using the template T2 of a large vessel on the mobile body region R5, two vessels adjacent to each other in a horizontal direction are detected separately as denoted by a reference sign R5'. The detection unit 13 may assume the case where template matching is wrong and detect the original mobile body region as a vessel. In that case, as post-processing by the detection unit 13, it is possible to delete those inappropriate as vessels on the basis of a preset erroneous detection determining method or a probability of a vessel shape.

Here, the function of the matching unit 12 described above will be further explained. The matching unit 12 may perform template matching by selecting a mobile body region on which template matching will be performed in a manner as described below. First, according to a result of extracting mobile body regions, the matching unit 12 may specify a mobile body region where a plurality of mobile bodies may exist, and perform template matching on such a mobile body region. Specifically, the matching unit 12 may check whether or not the shape, that is, the outer appearance, of the extracted mobile body region matches the outer appearance of one small vessel or a large vessel according to a preset criterion, and select an unmatched mobile body region as an object of template matching. As a result, a mobile body region whose aspect ratio differs from the outer appearance of the template so that a plurality of vessels may exist is selected as an object of template matching. At that time, the matching unit 12 may use the selected mobile body region as an object of template matching by arranging a plurality of templates particularly as described above. For the mobile body region not selected by the above-described method, it is considered that there is one vessel. Therefore, normal template matching may be performed thereon. For a mobile body region whose outer appearance matches the template, that is, not selected by the above-described method, the matching unit 12 may handle it as a region where there is one vessel, without performing template matching. Alternatively, the matching unit 12 may perform template matching for confirming presence of one vessel, without performing a process of arranging a plurality of templates.

Further, the matching unit 12 may specify a mobile body region where a plurality of mobile bodies may exist as an object of template matching, on the basis of a past result of detecting vessels, and perform template matching on such a mobile body region. Specifically, the matching unit 12 first acquires the position and the time of a mobile body region in the target image at which a plurality of vessels were detected in the past stored in the detection unit 13. Then, the matching unit 12 checks whether or not the acquired position and the time and the position and the time of the newly extracted mobile body region match according to a preset criterion, and may determine the matched newly extracted mobile body region as an object of template matching. As a result, a mobile body region in which a plurality of vessels may exist is selected as an object of template matching. At that time, the matching unit 12 may use the selected mobile body region as an object of template matching to be performed by arranging a plurality of templates particularly, as described above. For the mobile body regions not selected by the above-described method, normal template matching may be performed thereon. For the mobile body region that does not match the position and the time at which a plurality of vessels were detected in the past, the matching unit 12 may handle it as a region where there is one vessel, without performing template matching. Alternatively, the matching unit 12 may perform template matching for confirming presence of one vessel, without performing a process of arranging a plurality of templates.

The matching unit 12 may also select a template to be used for template matching from among the stored templates, on the basis of an extraction result of a mobile body region. For example, in the case where the template T1 of a small vessel and the template T2 of a large vessel as illustrated in FIG. 4(4-1) are stored in the template storage unit 16, it is possible to select one of the templates T1 and T2 corresponding to a side length or aspect ratio of the outer appearance of the mobile body region and use it for template matching. Moreover, in the case where the templates T3, T4, and T5 in which two vessels are adjacent to each other in the horizontal direction or the vertical direction as illustrated in FIG. 4(4-2) or FIG. 4(4-3) are stored in the template storage unit 16, it is possible to select such templates to perform template matching. In that case, the matching unit 12 performs template matching by using a plurality of templates for vessels when there is a possibility that a plurality of vessels exist in the mobile body region, according to a side length or aspect ratio of the outer appearance of the mobile body region. Furthermore, when a position or the time to be applied is linked with a template, the matching unit 12 may select a template to be used for template matching according to the position or the time of the mobile body region in the target image. Further, the matching unit 12 may perform template matching by using a plurality of templates for vessels when there is a possibility that a plurality of vessels exist in the mobile body region as a result of comparison with the past vessel detection results, according to a the position and the time of the mobile body region in the target image.

Note that the above-described templates may be registered in advance by a user or the like, or may be generated by the template generation unit 14 and stored in the template storage unit 16. At that time, the template generation unit 14 generates templates on the basis of the past vessel detection result. For example, when one vessel was detected frequently or a plurality of vessels were detected simultaneously at the same position or the same time in the target image in the past, the template generation unit 14 may generate templates as illustrated in FIG. 4 by using images of the detected vessel part.

[Operation]

Figure 6:
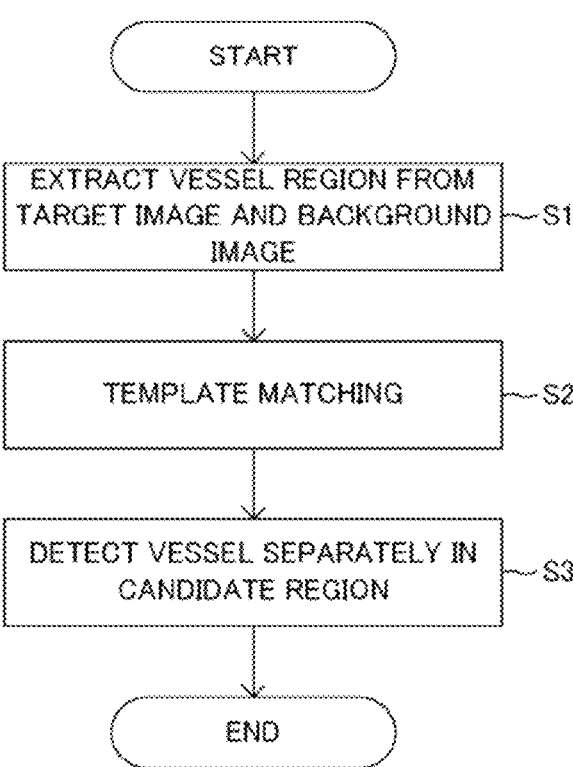
FIG. 6 is a flowchart illustrating an operation of the image processing device disclosed in FIG. 1.

Next, operation of the image processing device 10 described above will be described with mainly reference to the flowchart of FIG. 6. Note that in the image processing device 10, a plurality of past images of an object region captured in advance, a target image in which an object region for detecting a vessel is captured, and geographic information including position information of the land of the object region, are stored in the image storage unit 15.

First, the image processing device 10 reads out, from the image storage unit 15, a target image captured at a predetermined time that is an object time of processing to detect a vessel, and a background image, and generates a difference image from the target image and the background image as illustrated in FIG. 2. Then, on the basis of the generated difference image, the image processing device 10 extracts a pixel that is a candidate vessel on the target image, and on the basis of the pixel extracted as a candidate vessel, extracts a mobile body region that is a region where the vessel may exist, located on the target image (step S1). For example, as illustrated by rectangles R1, R2, R3, R4, and R5 of dotted lines in FIG. 3, the image processing device 10 extracts mobile body regions on the target image.

Then, the image processing device 10 performs template matching on the extracted mobile body regions by using the templates T1 and T2 stored in the template storage unit 16 (step S2). For example, the image processing device 10 performs template matching on the mobile body regions R3, R4, and R5 as illustrated in FIG. 5, by using the template T1 for one small vessel and the template T2 for one large vessel as illustrated in FIG. 4(4-1). As an example, as a process of template matching, the image processing device 10 checks the matching degree of the areas between a part of an object having a high luminance value in the mobile body region and the vessel portion of the template. Note that when the outer appearance of the mobile body region has a shape that can contain a plurality of templates, the image processing device 10 may arrange the template while shifting it within the mobile body region and check the matching degree with the part of the object having a high luminance value in the mobile body region at each position. For example, as illustrated in FIG. 5(5-1), in the case of performing template matching using the template T1 with respect to the mobile body region R3, the matching degree is checked by arranging the template T1 for two pieces.

Then, as a result of the template matching, when the matching degree is equal to or larger than a preset threshold, the image processing device 10 detects a mobile body of the mobile body region as a vessel (step S3). At that time, when the detection unit 13 performs template matching by arranging a plurality of templates in one mobile body region, and the matching degree in each region is equal to or larger than the threshold, the detection unit 13 detects a plurality of vessels separately. As an example, in the example illustrated in FIG. 5(5-1), through template matching performed by using the template T1 of a small vessel on the mobile body region R3, two vessels adjacent to each other in a horizontal direction are detected separately as denoted by a reference sign R3'.

As described above, in the present embodiment, a mobile body region where a vessel may exist is extracted from a target image, and a vessel is detected by performing template matching on the mobile body region. Therefore, even in the case where a plurality of vessels are adjacent to each other, it is possible to detect the respective vessels separately, so that detection can be performed with high accuracy.

[Modifications]

In the case of detecting a vessel as described above, there is a case of detecting a vessel berthed on the land. However, there is a problem that it cannot be detected with high accuracy due to signal interference caused by an on-land object installed on the land. That is, on a land where a vessel is berthed, there are on-land objects such as a bridge and a crane. Therefore, it is impossible to detect only a vessel with high accuracy due to signal interference caused by such on-land objects. In view of the above, in the present invention, the region extraction unit 11 of the image processing device 10 extracts a mobile body region as described below, so that it is possible to detect a vessel while suppressing interference with an on-land object. Hereinafter, another method of extracting a mobile body region by the region extraction unit 11 will be described with reference to FIGS. 7 to 11.

Figure 7:
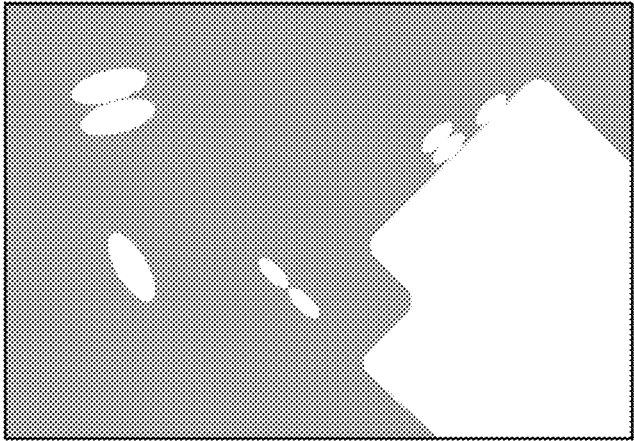
FIG. 7 illustrates another state of image processing by the image processing device disclosed in FIG. 1.
Figure 7:
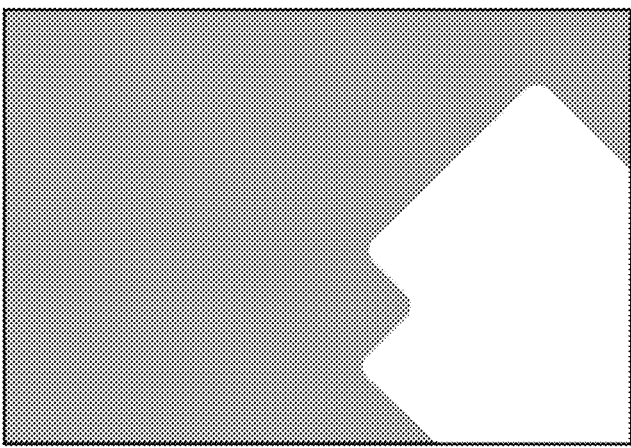
Figure 7:
Figure 8:
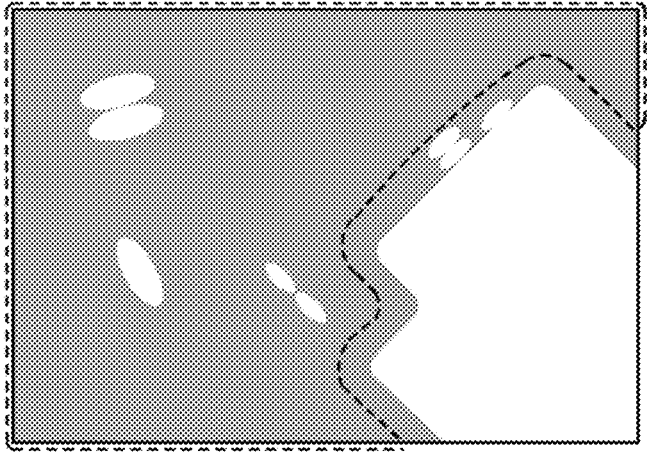
FIG. 8 illustrates another state of image processing by the image processing device disclosed in FIG. 1.
Figure 8:
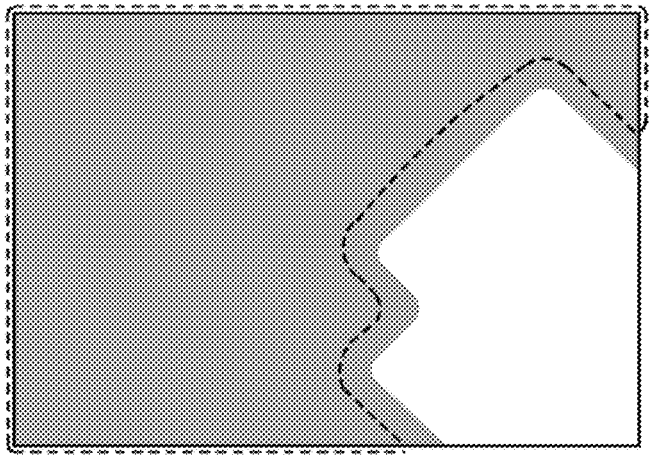
Figure 8:
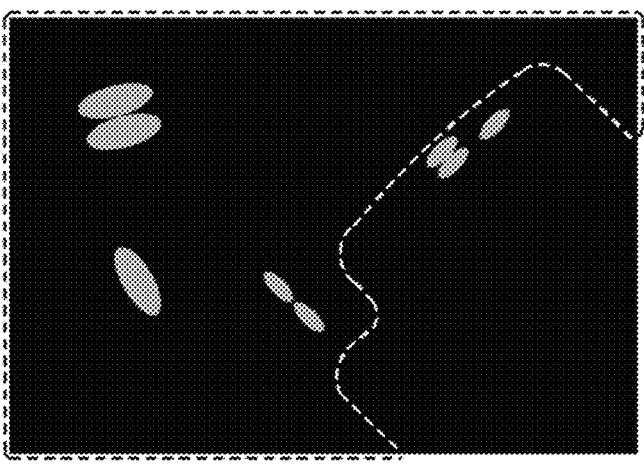
Figure 9:
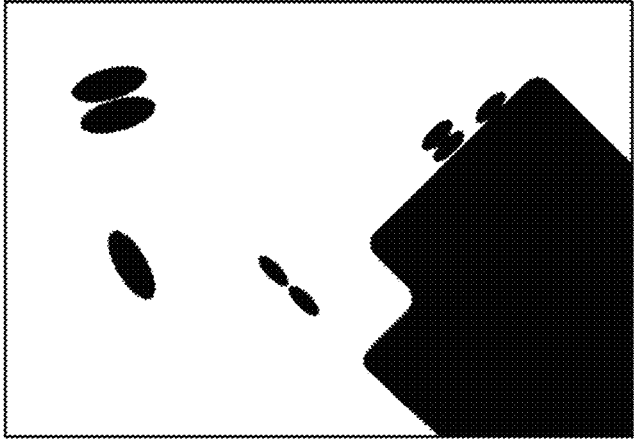
FIG. 9 illustrates another state of image processing by the image processing device disclosed in FIG. 1.
Figure 9:
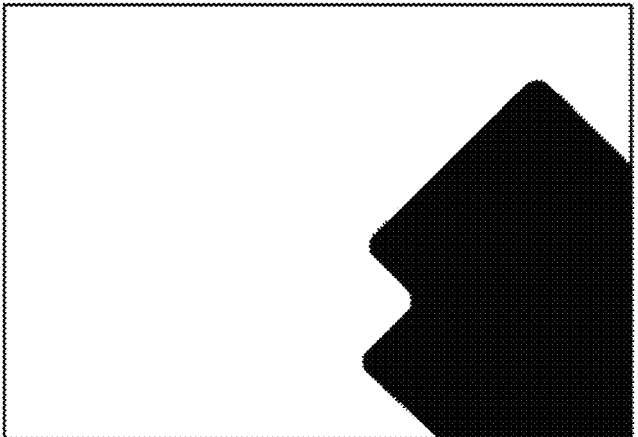
Figure 9:
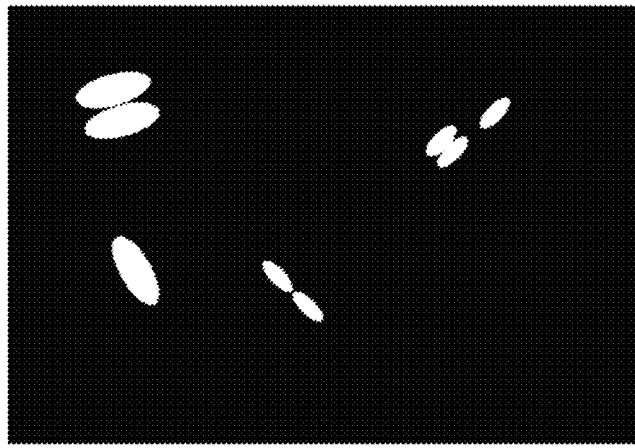
Figure 10:
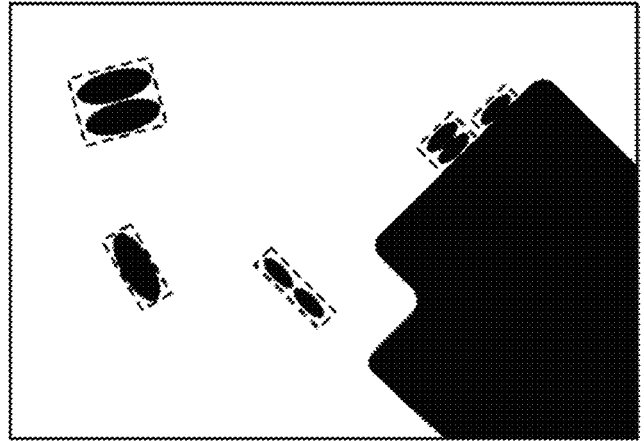
FIG. 10 illustrates another state of image processing by the image processing device disclosed in FIG. 1.
Figure 10:
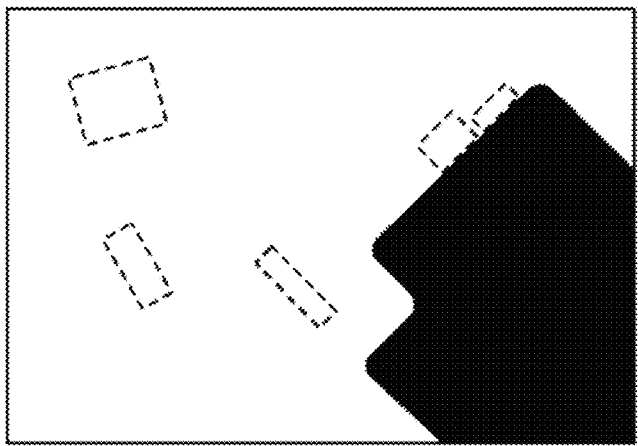
Figure 10:
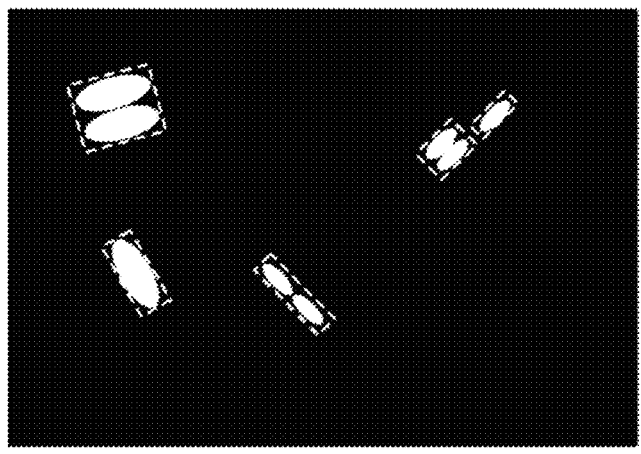
Figure 11:
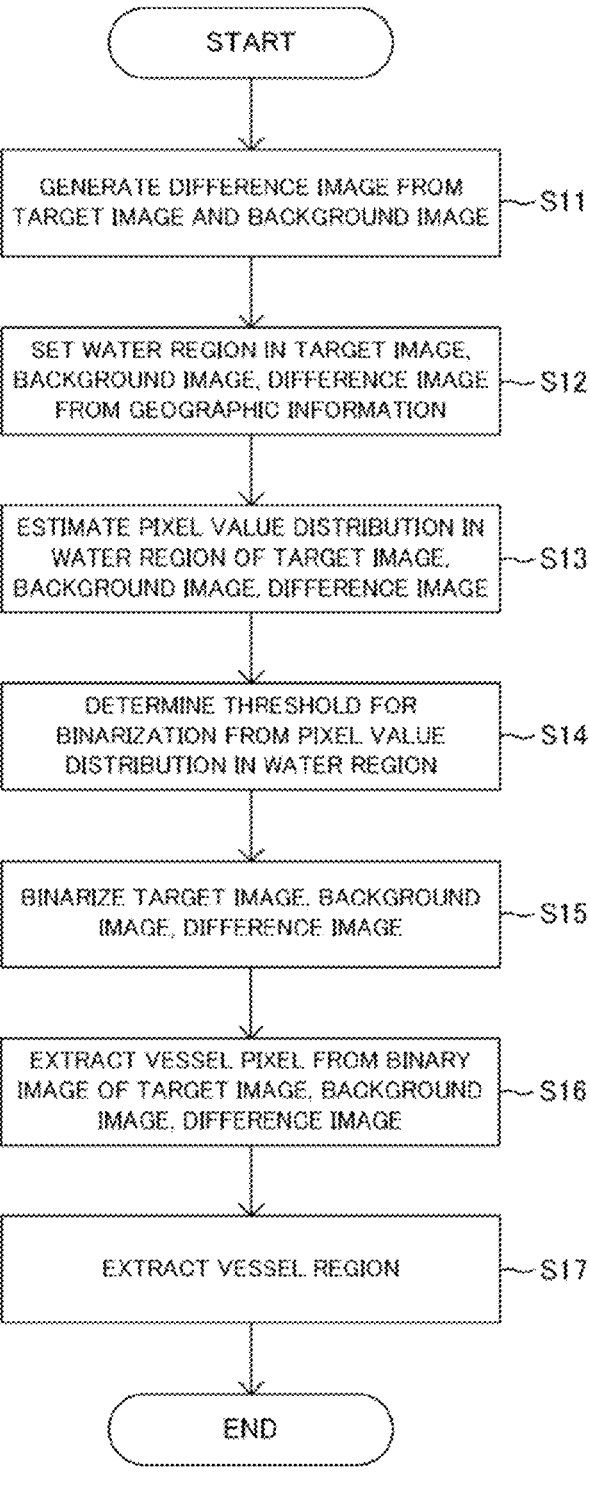
FIG. 11 is a flowchart illustrating another operation for image processing by the image processing device disclosed in FIG. 1.

First, as similar to the above description, the region extraction unit 11 reads out a target image and a background image and generates a difference image from the target image and the background image, as illustrated in FIG. 7 (step S11). Then, the region extraction unit 11 performs processing to binarize each of the target image, the background image, and the difference image. At that time, the region extraction unit 11 determines a threshold of a luminance value for binarization in each image. In the below description, first, a threshold setting process by the region extraction unit 11 will be described.

The region extraction unit 11 first uses the stored geographic information to set a water region (specific region) on the target image (step S12). Specifically, the region extraction unit 11 specifies a land region (exclusion region) representing the position of the land on the target image, from the position information included in the target image and the geographic information including the position information of the land.

Then, the region extraction unit 11 sets an extended land region (extended exclusion region) that is obtained by further extending the edge of the land adjacent to the water region in the land region by a predetermined distance to the water region side. For example, the region extraction unit 11 sets the extended land region by extending the edge of the land region adjacent to the water region to the water region side by 20 pixels in the target image, that is, by 20 m in the object region. Then, the region extraction unit 11 excludes the extended land region from the object region of the entire target image and sets the remaining region as a water region. Thereby, the region extraction unit 11 sets the water region on the target image as indicated by a region surrounded by a dotted line in the upper drawing of FIG. 8. similarly, the region extraction unit 11 sets a water region on the background image as illustrated by a region surrounded by a dotted line in the central drawing of FIG. 8, and sets a water region in the difference image as illustrated by a region surrounded by a dotted line in the lower drawing of FIG. 8.

In this manner, even if an on-land object is not included completely in the land region with the accuracy of the land region (exclusion region) described above, a water region of a predetermined region located adjacent to the land is excluded as an extended land region. Therefore, it is possible to set a water region in which on-land objects such as a bridge and a crane installed on the land are excluded. However, the region extraction unit 11 is not necessarily limited to set a water region by setting the extended land region as described above. The region extraction unit 11 may set a water region by excluding the land region from the object region, or may set a water region by means of another method.

Then, the region extraction unit 11 generates distribution of luminance values of pixels of a water region set in each of the target image, the background image, and the difference image (step S13), and from the distribution, sets a threshold of a luminance value for binarization (step S14). Specifically, for the target image, the region extraction unit 11 first generates distribution of luminance values of all pixels in the region set as a water region surrounded by a dotted line in the upper drawing of FIG. 8. At that time, for example, the region extraction unit 11 generates distribution of the luminance values of the pixels by approximating the distribution of the luminance values to a function. Then, from the generated distribution, the region extraction unit 11 sets a threshold of luminance values for binarizing the target image. In particular, the region extraction unit 11 sets a threshold of luminance values with which luminance values of the sea that can be considered as a water region and luminance values that can be considered as an object existing in the water region are distinguishable from each other, in the water region in the target image. Then, the region extraction unit 11 uses the threshold set for the target image to generate a binary image (converted image) in which the luminance value of each pixel in the entire target image is binarized (step S15). Thereby, the region extraction unit 11 generates a binary image as illustrated in the upper drawing of FIG. 9 from the target image.

Then, the region extraction unit 11 performs, on the background image and the difference image, the same processing as that performed on the target image, and generates binary images respectively. Specifically, for the background image, the region extraction unit 11 generates distribution of luminance values of all pixels in the region set as a water region surrounded by a dotted line in the central drawing of FIG. 8, and from the distribution, sets a threshold of the luminance values for binarizing the background image, and generates a binary image as illustrated in the central drawing of FIG. 9 from the background image by using such a threshold. At that time, the region extraction unit 11 sets a threshold of luminance values with which luminance values of the sea that can be considered as a water region and luminance values that can be considered as an object existing in the water region are distinguishable from each other, in the water region in the background image. Further, for the difference image, the region extraction unit 11 generates distribution of luminance values of all pixels in the region set as a water region surrounded by a dotted line in the lower drawing of FIG. 8, and from the distribution, sets a threshold of the luminance values for binarizing the difference image, and generates a binary image as illustrated in the lower drawing of FIG. 9 from the difference image by using such a threshold. At that time, the region extraction unit 11 sets a threshold of luminance values with which luminance values of the sea that can be considered as a water region and luminance values that can be considered as an object existing in the water region are distinguishable from each other, in the water region in the difference image. Thereby, the binary image of the difference image becomes a binary image in which a pixel having a change in the luminance value and a pixel having no change in the luminance value between the target image and the background image, that is, a pixel that can be considered as a water region and a pixel that can be considered as an object existing in the water region, are distinguishable from each other.

Then, the region extraction unit 11 extracts a pixel that is a candidate vessel by using the binary images of the target image, the background image, and the difference image generated as described above (step S16). At that time, the region extraction unit 11 determines, for each binary image, whether or not each pixel is a water region (specific region), and extracts a pixel of a candidate vessel based on the determination result of each binary image. For example, when the focused pixel satisfies that there is a change in the pixel values, that is, it is not a water region in the binary image of the target image, it is a water region in the binary image of the background image, and it is not a water region in the binary image of the difference image, the region extraction unit 11 extracts it as a pixel of a candidate vessel.

Then, the region extraction unit 11 specifies a mobile body region where a mobile body that is a vessel may exist located on the target image, on the basis of the pixel extracted as a candidate vessel as described above (step S17). For example, the region extraction unit 11 generates a figure configured of a plurality of pixels on the basis of the distance between the pixels extracted as a candidate vessel. As an example, when the pixels extracted as a candidate vessel are adjacent to each other or located within a range of a certain distance, the region extraction unit 11 puts a set of the pixels into one figure. In this way, the region extraction unit 11 extracts a region surrounded by a rectangle of a dotted line in FIG. 10 as a mobile body region, and extracts the mobile body region as surrounded by a rectangle of a solid line on the target image illustrated in FIG. 3.

Second Exemplary Embodiment

Figure 12:
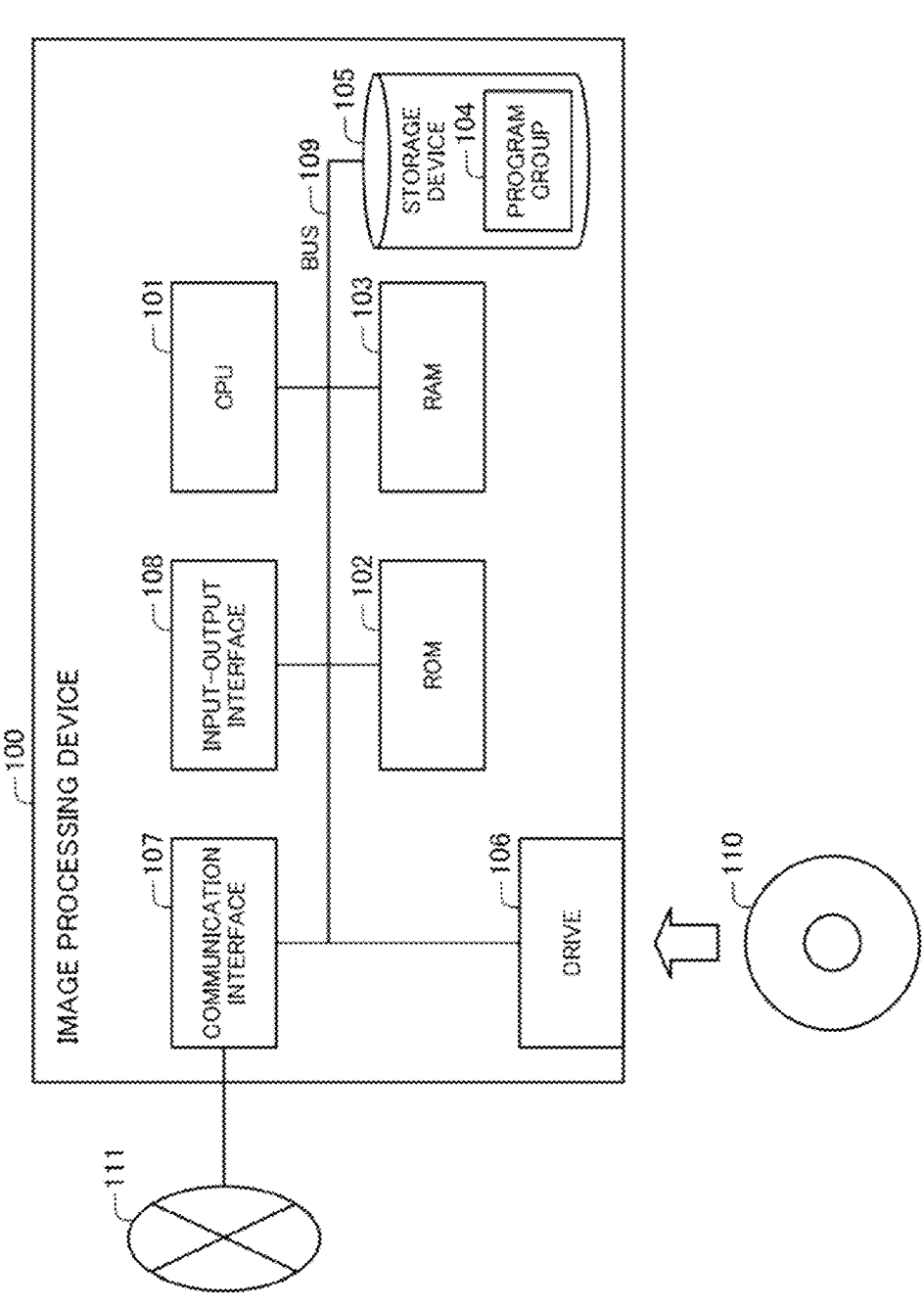
FIG. 12 is a block diagram illustrating a hardware configuration of an image processing device according to a second exemplary embodiment of the present invention.
Figure 13:
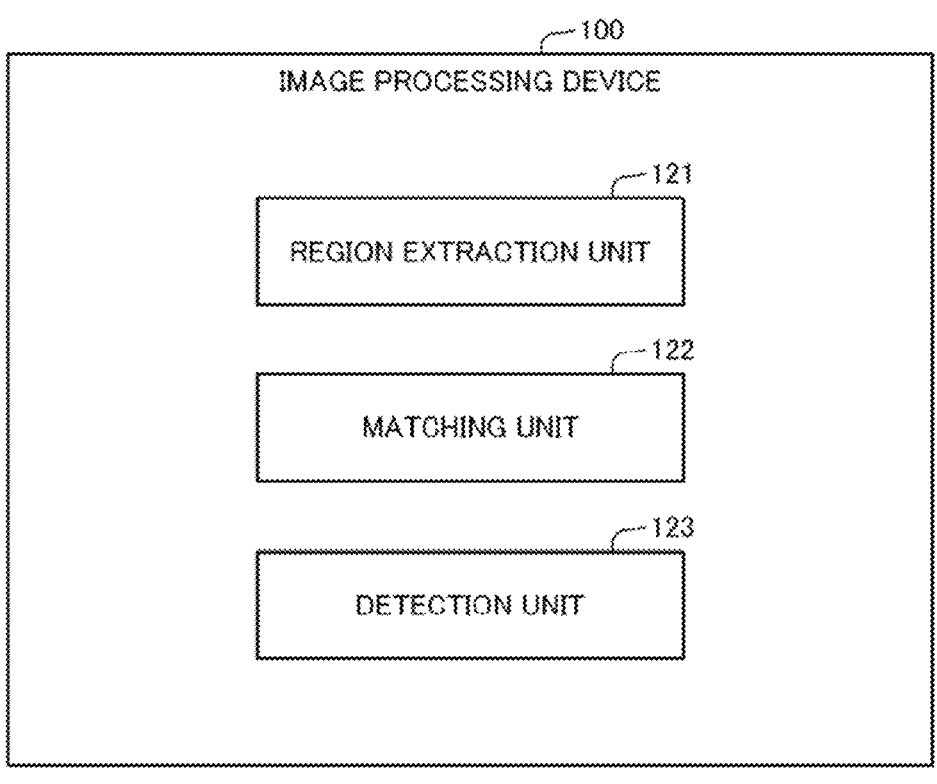
FIG. 13 is a block diagram illustrating a configuration of the image processing device according to the second exemplary embodiment of the present invention.
Figure 14:
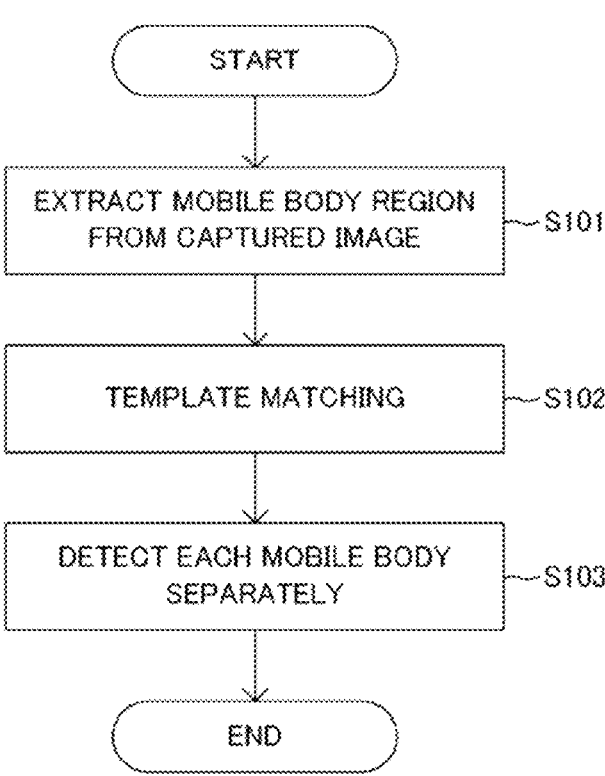
FIG. 14 is a flowchart illustrating an operation of the image processing device according to the second exemplary embodiment of the present invention.

Next, a second exemplary embodiment of the present invention will be described with reference to FIGS. 12 to 14. FIGS. 12 and 13 are block diagrams illustrating a configuration of an image processing device according to the second exemplary embodiment, and FIG. 14 is a flowchart illustrating an operation of the image processing device. Note that the present embodiment shows the outlines of the configurations of the image processing device and the image processing method described in the embodiment described above.

First, a hardware configuration of an image processing device 100 in the present embodiment will be described with reference to FIG. 12. The image processing device 100 is configured of a typical information processing device, having a hardware configuration as described below as an example.

Central Processing Unit (CPU) 101 (arithmetic device)
Read Only Memory (ROM) 102 (storage device)
Random Access Memory (RAM) 103 (storage device)

Program group 104 to be loaded to the RAM 103
Storage device 105 storing therein the program group 104
Drive 106 that performs reading and writing on a storage medium 110 outside the information processing device
Communication interface 107 connecting to a communication network 111 outside the information processing device
Input/output interface 108 for performing input/output of data
Bus 109 connecting the respective constituent elements The image processing device 100 can construct, and can be equipped with, a region extraction unit 121, a matching unit 122, and a detection unit 123 illustrated in FIG. 13 through acquisition and execution of the program group 104 by the CPU 101. Note that the program group 104 is stored in the storage device 105 or the ROM 102 in advance, and is loaded to the RAM 103 and executed by the CPU 101 as needed. Further, the program group 104 may be provided to the CPU 101 via the communication network 111, or may be stored on the storage medium 110 in advance and read out by the drive 106 and provided to the CPU 101. However, the region extraction unit 121, the matching unit 122, and the detection unit 123 may be constructed by dedicated electronic circuits for implementing such functions.

Note that FIG. 12 illustrates an example of a hardware configuration of the information processing device that is the image processing device 100. The hardware configuration of the information processing device is not limited to that described above. For example, the information processing device may be configured of part of the configuration described above, such as without the drive 106.

The image processing device 100 executes the image processing method illustrated in the flowchart of FIG. 14, by the functions of the region extraction unit 121, the matching unit 122, and the detection unit 123 constructed by the program as described above.

As illustrated in FIG. 14, the image processing device 100 executes processing to extract, from a captured image, a mobile body region that is a region in which a mobile body may exist (step S101), perform template matching on the mobile body region by using a template corresponding to a mobile body that is a detection object (step S102), and detect each mobile body from the mobile body region separately, on the basis of the template matching (step S103).

With the configuration described above, the present invention extracts, from a captured image, a mobile body region where a mobile body may exist, and detects a mobile body by performing template matching on the mobile body region. As a result, even in the case where a plurality of mobile bodies are adjacent to each other, it is possible to detect each mobile body separately. Therefore, it is possible to detect mobile bodies with high accuracy.

Note that the program described above can be stored in a non-transitory computer-readable medium of any type and supplied to a computer. Non-transitory computer-readable media include tangible storage media of various types. Examples of non-transitory computer-readable media include magnetic storage media (for example, flexible disk, magnetic tape, and hard disk drive), magneto-optical storage media (for example, magneto-optical disk), a CD-ROM (Read Only Memory), a CD-R, a CD-R/W, and semiconductor memories (for example, mask ROM, PROM (Programmable ROM), EPROM (Erasable PROM), a flash ROM, and a RAM (Random Access Memory)). The program may be supplied to a computer by a transitory computer-readable medium of any type. Examples of transitory computer-readable media include electric signals, optical signals, and electromagnetic waves. A transitory computer-readable medium can supply a program to a computer via a wired communication channel such as a wire or an optical fiber, or a wireless communication channel.

While the present invention has been described with reference to the exemplary embodiments described above, the present invention is not limited to the above-described embodiments. The form and details of the present invention can be changed within the scope of the present invention in various manners that can be understood by those skilled in the art. Further, at least one of the functions of the region extraction unit 121, the matching unit 122, and the detection unit 123 described above may be carried out by an information processing device provided and connected to any location on the network, that is, may be carried out by so-called cloud computing.

SUPPLEMENTARY NOTES

The whole or part of the exemplary embodiments disclosed above can be described as the following supplementary notes. Hereinafter, outlines of the configurations of an image processing method, an image processing device, and a program, according to the present invention, will be described. However, the present invention is not limited to the configurations described below.

Supplementary Note 1

An image processing method comprising:
extracting, from a captured image, a mobile body region that is a region having a possibility that a mobile body exists;
performing template matching on the mobile body region by using a template corresponding to a mobile body that is a detection object; and
detecting each mobile body from the mobile body region separately, on the basis of the template matching.

Supplementary Note 2

The image processing method according to supplementary note 1, further comprising
performing the template matching on the mobile body region that is specified as a region having a possibility that a plurality of mobile bodies exist on the basis of an extraction result of the mobile body region.

Supplementary Note 3

The image processing method according to supplementary note 2, further comprising
performing the template matching on the mobile body region that is specified as the region having a possibility that a plurality of mobile bodies exist on the basis of a shape of the mobile body region extracted.

Supplementary Note 4

The image processing method according to any of supplementary notes 1 to 3, further comprising
performing the template matching on the mobile body region that is specified as a region having a possibility that a plurality of mobile bodies exist on the basis of a past detection result of a mobile body.

Supplementary Note 5

The image processing method according to supplementary note 4, further comprising
performing the template matching on the mobile body region that is specified on the basis of a position and/or time in the captured image at which a plurality of mobile bodies were detected in past.

Supplementary Note 6

The image processing method according to any of supplementary notes 1 to 5, further comprising
performing the template matching by using the template selected on the basis of an extraction result of the mobile body region, from among templates stored in advance.

Supplementary Note 7

The image processing method according to supplementary note 6, further comprising
performing the template matching by using the template selected on the basis of a position and/or time in the captured image of the mobile body region extracted.

Supplementary Note 8

The image processing method according to any of supplementary notes 1 to 7, further comprising
generating the template on the basis of a past detection result of a mobile body.

Supplementary Note 9

The image processing method according to supplementary note 8, further comprising
generating the template on the basis of a position and/or time in the captured image of the mobile body detected in past.

Supplementary Note 10

An image processing device comprising:
a region extraction unit that extracts, from a captured image, a mobile body region that is a region having a possibility that a mobile body exists;
a matching unit that performs template matching on the mobile body region by using a template corresponding to a mobile body that is a detection object; and
a detection unit that detects each mobile body from the mobile body region separately, on the basis of the template matching.

Supplementary Note 11

The image processing device according to supplementary note 10, wherein
the matching unit performs the template matching on the mobile body region that is specified as a region having a possibility that a plurality of mobile bodies exist on the basis of an extraction result of the mobile body region.

Supplementary Note 12

The image processing device according to supplementary note 11, wherein the matching unit performs the template matching on the mobile body region that is specified as the region having a possibility that a plurality of mobile bodies exist on the basis of a shape of the mobile body region extracted.

Supplementary Note 13

The image processing device according to any of supplementary notes 10 to 12, wherein the matching unit performs the template matching on the mobile body region that is specified as a region having a possibility that a plurality of mobile bodies exist on the basis of a past detection result of a mobile body.

Supplementary Note 14

The image processing device according to supplementary note 13, wherein the matching unit performs the template matching on the mobile body region that is specified on the basis of a position and/or time in the captured image at which a plurality of mobile bodies were detected in past.

Supplementary Note 15

The image processing device according to any of supplementary notes 10 to 14, wherein the matching unit performs the template matching by using the template selected on the basis of an extraction result of the mobile body region, from among templates stored in advance.

Supplementary Note 16

The image processing device according to supplementary note 15, wherein the matching unit performs the template matching by using the template selected on the basis of a position and/or time in the captured image of the mobile body region extracted.

Supplementary Note 17

The image processing device according to any of supplementary notes 10 to 16, further comprising a template generation unit that generates the template on the basis of a past detection result of a mobile body.

Supplementary Note 18

The image processing device according to supplementary note 17, wherein the template generation unit generates the template on the basis of a position and/or time in the captured image of the mobile body detected in past.

Supplementary Note 19

A computer-readable medium storing thereon a program for causing an information processing device to execute processing to:

extract, from a captured image, a mobile body region that is a region having a possibility that a mobile body exists;

perform template matching on the mobile body region by using a template corresponding to a mobile body that is a detection object; and detect each mobile body from the mobile body region separately, on the basis of the template matching.

Supplementary Note 20

The computer-readable medium storing thereon the program according to supplementary note 19, wherein the program further causes the information processing device to execute processing to generate the template on the basis of a past detection result of a mobile body.

Supplementary Note A1

The image processing method according to any of supplementary notes 1 to 9, wherein the extracting the mobile body region includes:

generating a difference image representing a difference between an object image and a corresponding image, the object image being an image including a region from which a mobile body is to be detected, the corresponding image being another image including a region corresponding to the region of the object image; and extracting the mobile body region from the object image, on the basis of the object image, the corresponding image, and the difference image.

Supplementary Note A2

The image processing method according to supplementary note A1, further comprising extracting the mobile body region on the basis of a luminance value of a pixel in a specific region specified by a predetermined criterion from a region included in each of the object image, the corresponding image, and the difference image.

Supplementary Note A3

The image processing method according to supplementary note A2, further comprising setting an extended exclusion region that is generated by extending an exclusion region specified according to a predetermined criterion from a region included in each of the object image, the corresponding image, and the difference image, and determining a residual region in which the extended exclusion region is removed from the region included in each of the object image, the corresponding image, and the difference image, to be the specific region.

Supplementary Note A4

The image processing method according to supplementary note A2 or A3, further comprising for the specific regions included in the object image, the corresponding image, and the difference image respectively, generating distributions of luminance values of pixels in the respective specific regions, and detecting the mobile body region on the basis of the distributions generated for the respective specific regions.

Supplementary Note A5

The image processing method according to supplementary note A4, further comprising on the basis of the distributions generated for the respective specific regions included in the object image, the corresponding image, and the difference image, generating transformed images that are images from which the specific regions are detectable for the object image, the corresponding image, and the difference image respectively, and extracting the mobile body region on the basis of the generated transformed images.

Supplementary Note A6

The image processing method according to supplementary note A5, further comprising on the basis of the distributions generated for the respective specific regions included in the object image, the corresponding image, and the difference image, setting thresholds of luminance values for binarizing the object image, the corresponding image, and the difference image respectively, generating the transformed images obtained by binarizing the object image, the corresponding image, and the difference image respectively with use of the thresholds, and extracting the mobile body region on the basis of the generated transformed images.

Supplementary Note A7

The image processing method according to supplementary note A5 or A6, further comprising on the basis of each of the transformed images, determining whether or not a pixel in the transformed image is the specific region, and extracting the mobile body region on the basis of a determination result.

Supplementary Note A8

The image processing method according to any of supplementary notes A5 to A7, further comprising on the basis of the respective transformed images, detecting a pixel determined that the pixel is not the specific region in the object image, that the pixel is the specific region in the corresponding image, and that the pixel has a change in a luminance value in the difference image, and extracting the mobile body region on the basis of the detected pixel.

Supplementary Note A9

The image processing method according to any of supplementary notes A2 to A8, wherein the specific region is a water region.

REFERENCE SIGNS LIST 10 image processing device
11 region extraction unit
12 matching unit
13 detection unit
14 template generation unit
15 image storage unit 16 template storage unit
100 image processing device
101 CPU
102 ROM
103 RAM
104 program group
105 storage device
106 drive
107 communication interface
108 input/output interface
109 bus
110 storage medium
111 communication network
121 region extraction unit
122 matching unit
123 detection unit

The invention claimed is:

1. An image processing method comprising:

specifying, in a captured image, a candidate region for detecting an object;

performing template matching on the candidate region by using a plurality of templates corresponding to a plurality of objects to be detected, each of the plurality of templates being matched within the same candidate region; and based on the template matching, separately detecting each of the plurality of objects in the same candidate region;

wherein the candidate region is specified when an outer appearance of the candidate region does not match an outer appearance of a template according to a preset criterion.

2. An image processing device comprising:

at least one memory configured to store instructions; and at least one processor configured to execute instructions to:

specify, in a captured image, a candidate region for detecting an object;

perform template matching on the candidate region by using a plurality of templates corresponding to a plurality of objects to be detected, each of the plurality of templates being matched within the same candidate region; and based on the template matching, separately detect each of the plurality of objects in the same candidate region, wherein the candidate region is specified when an outer appearance of the candidate region does not match an outer appearance of a template according to a preset criterion.

3. The image processing device according to claim 2, wherein the at least one processor is configured to execute the instructions to:

perform the template matching on the candidate region that is specified as a region having a possibility that a plurality of objects exist, based on an extraction result of the candidate region.

4. The image processing device according to claim 3, wherein the at least one processor is configured to execute the instructions to:

perform the template matching on the candidate region that is specified as the region having a possibility that a plurality of objects exist, based on a shape of the candidate region.

5. The image processing device according to claim 2, wherein the at least one processor is configured to execute the instructions to:

perform the template matching on the candidate region that is specified as a region having a possibility that a plurality of objects exist, based on a past detection result of an object.

6. The image processing device according to claim 5, wherein the at least one processor is configured to execute the instructions to:

perform the template matching on the candidate region that is specified based on at least one of: (i) a position or (ii) a time, in the captured image, at which a plurality of objects were detected in the past.

7. The image processing device according to claim 2, wherein the at least one processor is configured to execute the instructions to:

perform the template matching by using a template selected, from among templates stored in advance, based on an extraction result of the candidate region.

8. The image processing device according to claim 7, wherein the at least one processor is configured to execute the instructions to:

perform the template matching by using a template selected based on at least one of: (i) a position or (ii) a time, in the captured image, of the candidate region.

9. The image processing device according to claim 2, wherein the at least one processor is configured to execute the instructions to:

generate a template based on a past detection result of an object.

10. The image processing device according to claim 9, wherein the at least one processor is configured to execute the instructions to:

generate the template based on at least one of (i) a position or (ii) a time, in the captured image, of the object detected in the past.

11. An image processing method comprising:

specifying, in a captured image, a candidate region for detecting an object;

performing template matching on the candidate region by using a plurality of templates corresponding to a plurality of objects to be detected, each of the plurality of templates being matched within the same candidate region; and based on the template matching, separately detecting each of the plurality of objects in the same candidate region;

wherein the specified candidate region has an aspect ratio that differs from an outer appearance of a template.

\* \* \* \* \*